US005117108A

United States Patent [19]

Muller et al.

[11] Patent Number: 5,117,108

[45] Date of Patent: May 26, 1992

[54] LASER MICROPROBE INTERFACE FOR A MASS SPECTROMETER

[75] Inventors: Jean-François Muller, Metz; François Tollitte, Belleville Les Verdun; Gabriel Krier; Marc Pelletier, both of Metz, all of France

[73] Assignee: University of Metz, Etablissement Public Caractere Scientifue et Culturel, Metz, France

[21] Appl. No.: 487,992

[22] PCT Filed: Jul. 6, 1989

[86] PCT No.: PCT/FR89/00351

§ 371 Date: May 4, 1990

§ 102(e) Date: May 4, 1990

[87] PCT Pub. No.: WO90/00811

PCT Pub. Date: Jan. 25, 1990

[30] Foreign Application Priority Data

Jul. 7, 1988 [FR] France ................ 88 09438

[51] Int. Cl.[5] ................ B01D 59/44; H01J 49/40

[52] U.S. Cl. ................ 250/288; 250/423 P

[58] Field of Search ................ 250/281, 288, 423 P, 250/291

[56] References Cited

U.S. PATENT DOCUMENTS

| | | | |
|---|---|---|---|
| 4,204,117 | 5/1980 | Aberle et al. | 250/423 P |
| 4,535,235 | 8/1985 | McIver | 250/291 |
| 4,686,365 | 8/1987 | Meek et al. | 250/281 |
| 4,739,165 | 4/1988 | Ghaderi et al. | 250/290 |
| 4,755,670 | 7/1988 | Syha et al. | 250/291 |
| 4,829,178 | 5/1989 | Waugh | 250/288 |

FOREIGN PATENT DOCUMENTS

| | | |
|---|---|---|
| 0185944 | 7/1986 | European Pat. Off. . |
| 2138626 | 10/1984 | United Kingdom . |

OTHER PUBLICATIONS

"Laser Descorption Fourier Transform Ion Cyclotron Resonance Mass Spectrometry vs Fast Atom Bombardment Magnetic Sector Mass Spectrometry for Drug Analysis", Shomo et al., *Anal. Chem.*, vol. 57, pp. 2940-2944, No. 14, Dec. 1985.

H. Vogt, et al., "Lamma 500 Principle and Technical Description of the Instrument," Fresenius Z. Anal. Chem., vol. 308, pp. 195-200, 1981.

*Primary Examiner*—Bruce C. Anderson
*Attorney, Agent, or Firm*—Foley & Lardner

[57] ABSTRACT

In a laser microprobe interface for a mass spectrometer, such as a Fourier transform mass spectrometer, the focusing optical system (1) and the viewing optical system (4) are arranged in the cell holder (5) of the spectrometer itself. The focusing optical system (1) can be moved by an adjustment means (2) so as to make allowance for the variation of the focal distance with the wavelength of the primary ionization laser beam (3) and is arranged at the center of the viewing optical system (4) of the achromatic inverted cassegrain type. The latter optical system provides perfect definition of the image and a high magnification together with a good depth of field and good laser focusing. The arrangement of the focusing optical system (1) at the center of the viewing optical system (4) also allows the focusing optical system (1) to be interchanged with other ionization means.

21 Claims, 4 Drawing Sheets

LASER MICROPROBE INTERFACE FOR A MASS SPECTROMETER

The present invention concerns a laser microprobe interface for a mass spectrometer, such as a Fourier transform mass spectrometer featuring a cell holder which holds a double cell—source cell and analysis cell—situated at the core of a superconductor magnet, the ions being generated within the source cell by means of electron impact, preferably perpendicular on the introduced samples, before being analyzed there at means pressure, therefore at low resolution, and then transferred through an orifice in a conducting plate into the axis of a magnetic and temporarily charged field, called, into the analysis cell where they are analyzed at very low pressure, therefore at very high spectral resolution, the interface itself principally composed of, firstly, focusing optics and visualizing optics, secondly, of an optical stage which allows for the introduction and adjustment of laser rays as well as for the visualization of the samples and, finally, of a system for the introduction of the samples.

Actually, laser microprobe interfaces for time of flight mass spectrometers are already known, both in the transmission configuration, such as those known commercially as LAMMA 500 and manufactured by the LEYBOLD-HERAEUS company, and in the reflection configuration, such as those commercially known as LAMMA 1000 and manufactured by the LEYBOLD-HERAEUS company. We also know of laser microprobe interfaces having a transmission and reflection configuration, such as those commercially known as LIMA and manufactured by the CAMBRIDGE MASS SPECTROMETRY Company, Ltd.

These interfaces offer the advantage of good sensitivity and good spatial resolution, and allow for good reproduction and rapidity of measurement.

However, they have the major disadvantage of only allowing for a limited spectral resolution. Actually, since the interval of the total time between two ions is less than a nanosecond, this exceeds the capabilities of the most rapid transitory recording devices presently existing on the market.

Therefore we have conceived laser microprobe interfaces for use with a Fourier transform mass spectrometer, which allows for operation in a highly pressurized vacuum, and offers a very high spectral resolution. However, since the ions must be generated within the magnetic field, the major problem is that of being able to take advantage of an almost perfect vacuum in the analyzing cell, which is to say a vacuum on the order of $10^{-9}$ torr, in order to increase the life of the ions to be analyzed, so that after the Fourier transformation of the interferogram (image current that, amplified, forms the detection signal), a mass spectrum with a high spectral resolution is obtained, with the difference in mass $$\frac{m}{\text{delta } m}$$

between two ions separated at 10% from the well (height of the peak) having to be larger than 100,000.

In an initial device, the double cell of the mass spectrometer using the Fourier transformation is separated by a semi-sealing conducting metallic wall, penetrated by a small orifice, this allowing, firstly, for the transfer of ions from the source cell to the analysis cell, secondly, ensuring a differential vacuum between the two cells on the order of $10^2$ torr, which is to say, $10^{-7}$ for the source cell, and $10^{-9}$ for the analysis cell, and finally allowing for trapping of the ions in one or the other of the two cells by adequately adjusting the potential.

In this way, a high spectral resolution is obtained. as well as good focusing at 90° in relation to the sample (therefore a perfectly circular impact), and ease in handling the sample. In this device, however, sample visualization must be ensured by an endoscope. Now, since an endoscope cannot magnify an image more than 10 times, the result is a very low image definition. It is understood that it would be possible to visualize the sample using the same optics that are used to focus the laser rays. However, given the focal length of the lens having a diameter of 110 mm, and the maximum magnification of a telescope which is on the order of 25 times, only a total magnification of 50 times could be expected, which is, of course, plainly insufficient. Moreover, the diameter of the first black ring of the diffraction spot is at least on the order of five to six micrometers, which is certainly acceptable, but relatively high.

A second device intended to alleviate this disadvantage features a lens having a focal length of 75 mm that is used both for focusing and for visualizing each sample, thanks to an external light guide. However, from the above it follows that the incidence of the laser rays in relation to the sample is at 45°, which causes an oval spot and therefore an expansion of the plasma in the opposite direction, a loss of ions and inferior sensitivity (thus we come back to the configuration of the laser microprobe interface known commercially as LAMMA 1000). Moreover, this incidence of the laser rays at 45° causes difficulties in fine-tuning the image, which remains blurred. Moreover, in spite of everything, the magnification does not exceed 80 times. As for the diameter of the first black ring of the diffraction spot, it remains on the order of five to six micrometers.

Finally, these two devices make it difficult to associate a laser ionization with other ionization modes, such as, for example, ionization by ion or electron bombardment, because their geometry is too complex and not suited for the purpose.

The general problem to be solved by the object of the present invention consists therefore in devising a laser microprobe interface for a mass spectrometer using Fourier transformation and featuring, on the one hand, a very high spectral mass resolution, at least higher than 100,000, while at the same time taking advantage of an almost perfect vacuum in the analysis cell, such a vacuum being on the order of $10^{-9}$ torr; on the other hand, providing good image resolution, with a minimum magnification of 200 times, while at the same time offering better laser focusing, which is to say a diameter of the first black ring of the diffraction spot being four micrometers at the most, and good versatility, which is to say the possibility of associating the laser ionization with other means of ionization.

To this effect, the object of the invention is a laser microprobe interface for a mass spectrometer, more particularly employing the Fourier transformation, the latter featuring a cell holder which holds a double cell—source and analysis—situated at the core of a superconductor magnet, the ions being generated within the source cell by means of electron impact, preferably perpendicular to the introduced samples, before being analyzed at mean pressure, therefore at low resolution, and then transferred through an orifice in a plate, called the conductance limit, into the axis of a magnetic and temporarily charged field, and then into the analysis cell where they are analyzed at very low pressure. Therefore at very high spectral resolution, the interface itself being principally composed of, firstly, focusing optics and visualizing optics, secondly of an optical stage which allows for the introduction and adjustment of laser rays, as well as for the visualization of the samples and, finally, of a system for the introduction of the samples. The interface is characterized by the fact that the focusing and visualization optics are located in the cell-holder of the mass spectrometer itself, the focusing optics being adjustable by some means, in order to take into account the focal length as a function of the wave length of the primary ionization laser beam, and located at the center of the visualization optics of the achromatic inverted Cassegrain type, the latter ensuring a perfect image definition and a significant magnification, while at the same time offering good depth of field and good laser focusing, with the location of the focusing optics in the center of the visualization optics also allowing for an interchangeability of the focusing optics with other ionization means.

The invention will be better understood by reading the following description, which is given as a non limiting example, and explained with reference to the attached schematic drawings, in which.

Figure 1:
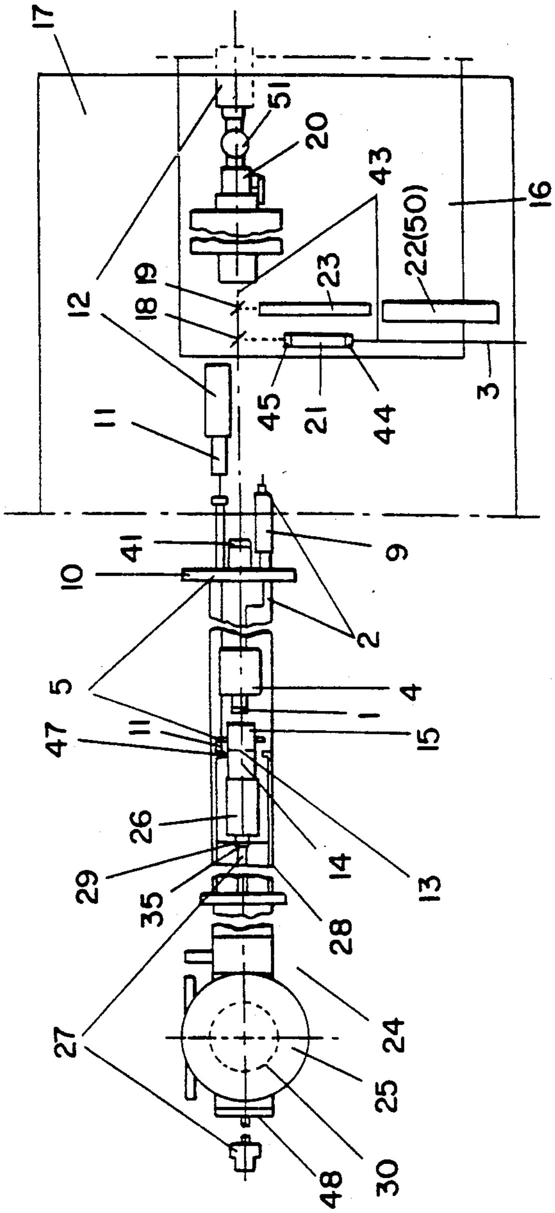
FIG. 1 represents a schematic view from above of the interface unit according to the invention.

According to the invention, the focusing optics 1 and the visualization optics 4 are located inside the cell-holder 5 of the mass spectrometer itself, the focusing optics 1 being adjustable by a means 2, in order to take into account the variation of the focal distance of the primary ionization laser ray 3, and located at the center of the visualization optics 4 of the achromatic inverted Cassegrain type, the latter ensuring perfect image definition and significant magnification, while at the same time featuring good depth of field and good laser focusing, the location of the focusing optics 1 at the center of the visualization optics 4 also allowing for interchangeability of the focusing optics 1 with other ionization means. The focusing optics 1/visualization optics 4 unit is mounted onto a structure of concentric steel bars, which support and connect the double cell 14, 15 of the mass spectrometer with Fourier transformation to the unit responsible for delivering power and controlling the different potentials or high frequency currents of the various plates of the double cell 14, 15. This optical unit is placed in a vacuum, with a support clamp 10 located externally to the double cell 14, 15 and featuring, within the optical axis, a window 41 made of ultra pure silica, in particular the silica which is known commercially as SUPRASIL, having a diameter of about 30 mm, and capable of withstanding temperatures on the order of 200° C. during the heating operations.

Figure 2:
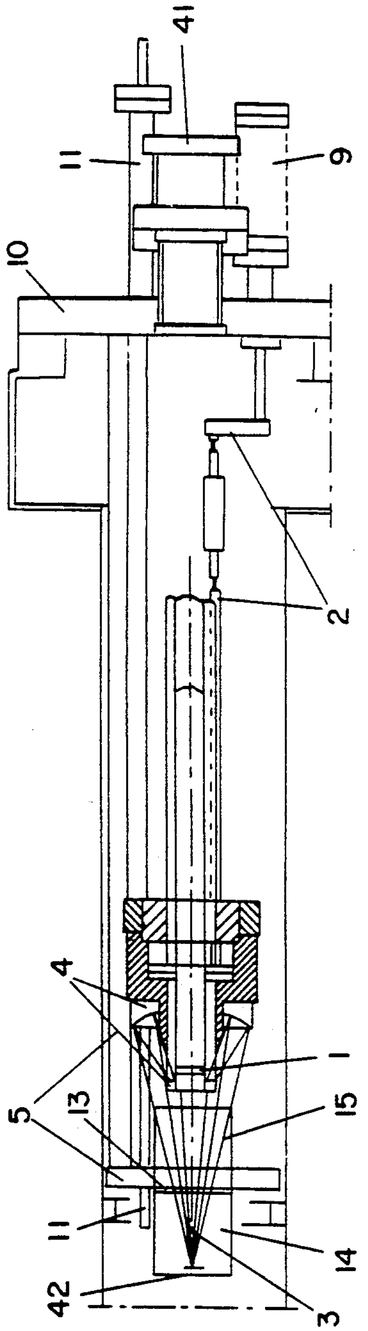
FIG. 2 is a front and cross-sectional view of the cell-holder of the interface according to the invention, inside which are located the focusing and visualization optics.

As shown in FIG. 2 of the attached drawings, the focusing optics 1, located at the center of the visualization optics 4, features two lenses 6 and 7, and integrates a protection window 8, said optics being, moreover, integral with the means 2 which ensures their adjustment in order to take into account the variation of the focal distance in relation to the wave length of the ionizing laser ray 3.

The lenses 6, 7 are also, advantageously, made of ultra pure silica known commercially as SUPRASIL, they are not treated and have a focal length between 105 and 127 mm, depending on the wave length of the ionizing laser ray 3. The protection window 8, which is interchangeable, is also advantageously made of pure silica, known commercially as SUPRASIL. The image quality will be on the order of 4 micrometers at 250 nm. The lenses 6, 7 and the window 8 can also be made of quartz.

As shown in FIG. 2 of the attached drawings, the means of adjustment 2 is in the form of a mobile pullrod, operated by an air tight blower 9 which is located at the exterior of the support clamp 10 for the double cell 14, 25.

The cell-holder 5 itself has the form of an annular piece, fastened to the clamp 10 by eight bars which contain the insulated conductors carrying power to eight plates of the double cell 14, 15, and from there to the limit conductance 13. The unit comes to a stop against an internal annular shoulder 47, with the help of a flexible silver annular joint.

Thus, the adjustable pullrod 2 allows the adjusting of the two lenses 6, 7 in order to take into account the variation of the focal distance as a function of the wave length of the ionizing laser ray (193 nm to 360 nm). Ionization can therefore be achieved using several different types of lasers, since the focusing optics 1 is interchangeable, for example, with zinc selenide optics for $CO_2$ lasers (in which case it is necessary to also replace the window 4 with a window made of Ca fluoride, transparent to infra-red and visible ultraviolet radiation), or else with a source of primary ions (SIMS source,) or with a californium source (desorption by heavy atoms originating from fission of californium 252,) or with an electron source, each one being designed in order to lodge within the space defined at the center of the visualization optics 4 of the inverted Cassegrain type.

According to another characteristic of the invention, the visualization optics 4 of the achromatic inverted Cassegrain type has an expansion of about 100 mm, therefore providing an image quality which is limited by diffraction, with a diameter of the first black ring of the diffraction spot being a maximum of 4 micrometers, the observed field being $\pm 0.25$ mm around the focusing point of the laser ray 3.

This type of optics will be advantageously made of titanium. Moreover, the two mirrors of said optics 4 will be treated with protected aluminum, which ensures a transmission higher than 75% in the visible spectrum. This visualization optics 4 of the inverted Cassegrain type ensures, therefore, precise fine-tuning and simultaneous visualization of the laser impact points. It is achromatic, which is to say that it provides a perfect image definition as well as significant magnification, on the order of 200 times. Moreover, the depth of field is good, a necessary condition when observing and analyzing non-polished surfaces.

It is understood that the focusing optics 1 and the visualization optics 4 are designed so as to be heated at 200° C., since in a mass spectrometer with Fourier transformation it is necessary to perform such an operation from time to time, in order to eliminate the memory effects associated with the adsorption of analyzed molecules by the walls or grids or the source cell 14 or of the analysis cell 15.

According to a supplementary characteristic of the invention, the cell-holder 5 has a diameter sufficient to allow for the introduction of the visualization optics 4 and of an endoscope 11 with a light guide, supported by the support clamp 10 and by the cell-holder 5. It is understood that all of the above can be heated at 200° C.

FIG. 1 of the attached drawings represents the optical stage 16, in the form of an optical plane 17 on which are located, within the axis of the magnetic field, a total mirror 18 and a semi-transparent film 19, for the reflection of the laser ray 3, an autocollimater sight glass 20, and, perpendicular to the optical axis, a telescope 21 for the expansion of the power laser ray 3, and a pilot helium-neon laser 22 which is followed by an expander 23 of said laser ray 22.

It is advantageous to note that the visualization optics 4 can also be used as focusing optics for a power laser, by replacing the pilot helium-neon laser 22 with a visible ultraviolet power laser 50. The semi-transparent film 19 is treated so that it reflects the ultraviolet, and is transparent to visible rays. The expander 23 must feature two lenses made of pure silica, in order to accept the power ultraviolet rays 50.

Figure 4:
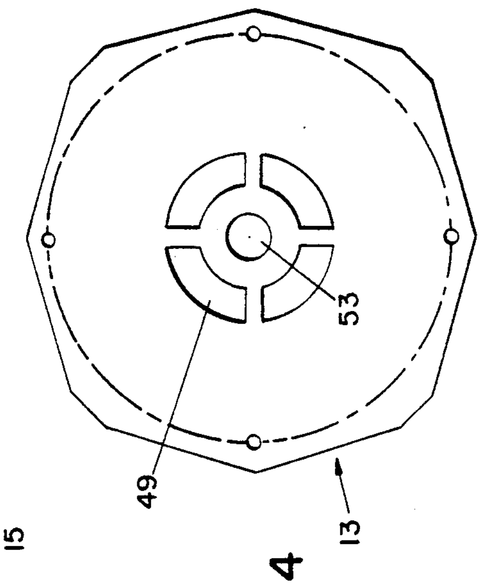
FIG. 4 is a front view of the conductance limit of the focusing and visualization optics, represented in FIG. 3, of the interface according to the invention.

The conductance limit 13, as represented in FIG. 4 of the attached drawings, features, around the orifice 53 which ensures the ion transfer and the passage of the laser ray 3, a lamella 49 which allows for the passage, on the one hand, of the helium-neon laser ray 22 or of the power visible ultraviolet laser 50, on the other hand, of the light ray generated by a system 51 which is incorporated in the sight glass 20, and finally of the ray 52 which is reflected by the samples, while at the same time preserving the desired differential vacuum between the source cell 14 and the analysis cell 15.

The orifice 53 advantageously has a maximum diameter of 4 mm, so that the differential vacuum between the source cell 14 and the analysis cell 15 is at least a factor of 100 ($10^{-7}$ torr in the source cell 14, and $10^{-9}$ torr in the analysis cell 15).

The conductance limit 13, preferably made of titanium or of an amagnetic conductor alloy, thus allows for the passage of the ionizing laser ray 3 from the source cell 14 to the analysis cell 15, as well as for the passage of the various light and visualization reflected rays, without the differential vacuum being disturbed ($10^{-7}$ torr in the source cell 14, and $10^{-9}$ torr in the analysis cell 15).

It is understood that, in order to achieve the above, the analysis cell 15 must have a good pumping capacity and must not leak, in particular because of the lamella 49, composed of quartz, inserted between the two perforated metallic parts of the limit conductance 13. The honeycomb perforated trapping plate 54 of the analysis cell 15 features a central orifice having a diameter of 10 mm, in order not to alter the passage of the ionizing laser ray 3.

Figure 5:
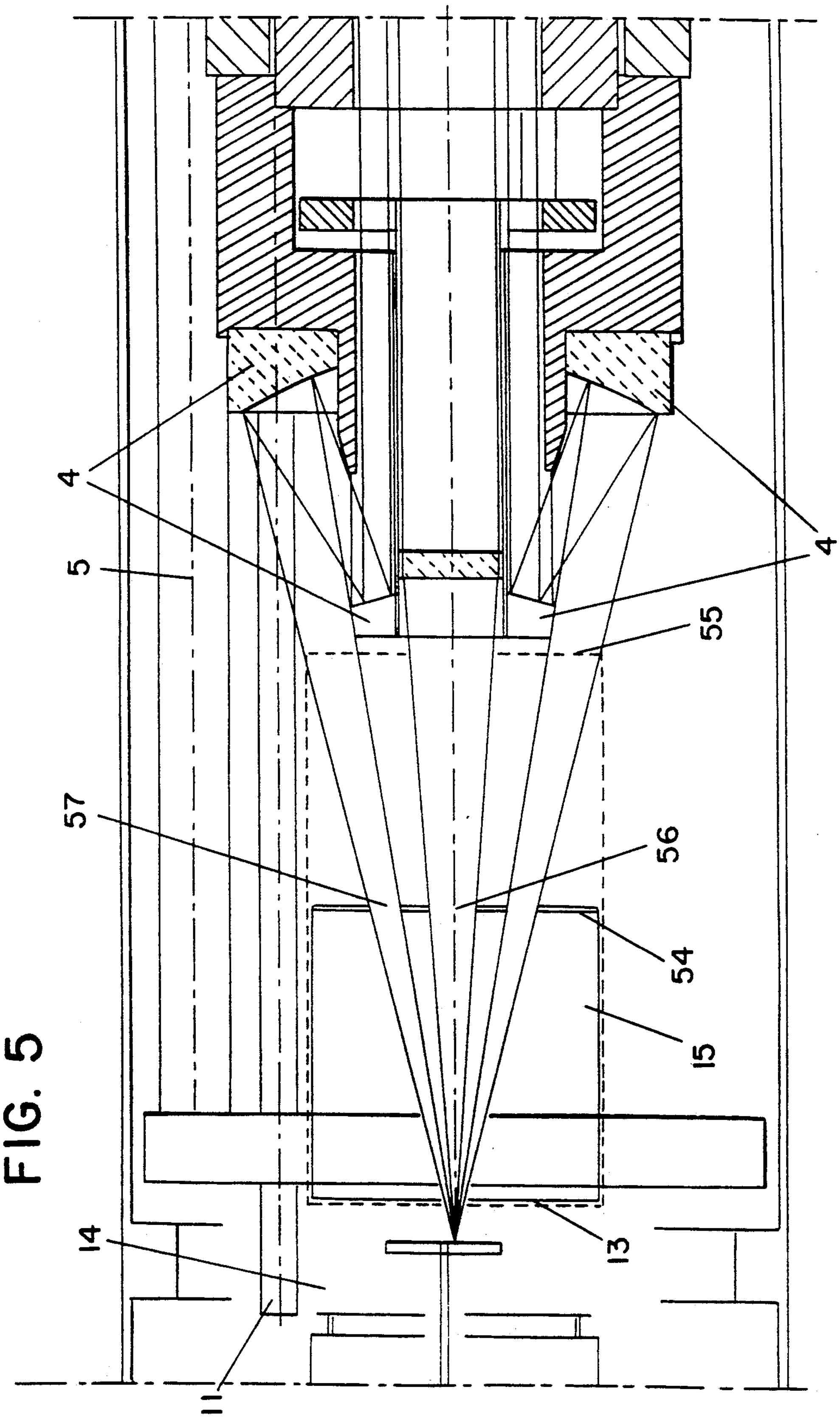
FIG. 5 is a magnified front and cross-sectional view of a variation of embodiment of the focusing and visualization optics.

According to an embodiment of the invention, represented in FIG. 5 of the attached drawings, the conductance limit 13 features a single central orifice 53 which ensures the transfer of the ions and the passage of the laser ray 3, the analysis cell 15 being in this case either cubical, in which case the honeycomb perforated trapping plate 54 features a central orifice 56 and an annular orifice 57 which allow for the passage, on the one hand, of the helium-neon laser ray 22 or of the visible ultraviolet laser ray 50, and on the other hand, of a light ray generated by a built-in lighting system 51 of the sight glass 20, and finally of the ray 52 reflected by the samples, while at the same time preserving the desired differential vacuum between the source cell 14 and the analysis cell 15, or parallelepipedal, or else mixed parallelepiledal, which is to say featuring two sets of two excitation plates and two sets of two reception plates, the honeycomb perforated trapping plate being, in these two latter cases, only penetrated by a central orifice meant for the passage of the ionizing laser ray 3.

This embodiment is characterized, therefore, by the suppression of the excitation and reception plates of the source cell 14, by drawing the surface of the sample closer to the conductance limit 13, to about 5 mm, said conductance limit only featuring, in this case, one central orifice 53 with a maximum diameter of 4 mm, in order to preserve the factor 100 of the differential vacuum.

In this embodiment, through a simple adjustment of the visualization optics toward the support clamp 10 by a sliding motion on the support bars, the analysis cell 15 can thus be replaced:

- by a cubical cell 15, in which the trapping plate 55 features a central orifice 56 with a maximum diameter of 10 mm and an annular orifice 57;
- by a parallelepipedal cell 15, the dimensions of which will have to be optimized (for example, 48 mm wide, 96 mm long.) In this case, the trapping plate 55 will only feature a central orifice with a diameter of 10 mm, intended for the passage of the laser ray 3;
- by a mixed parallelepipedal cell 15, having a trapping plate 55 identical to the previously described one.

In addition, the optical plane 17 is advantageously made of aluminum or of amagnetic, inoxidable steel. Various optical rails 43 are fastened on this plane 17. Said plane 17 can be replaced, for example, by an antivibration plane made of alveolated material. The mirror 18 is inclined at a 45° angle, preferably having a diameter of about 16 mm and being treated with aluminum in order to optimize the reflection of the power laser ray 3. This mirror 18 can, for example, be fastened on a support which allows for the passage of light and observation rays. The unit will be placed on a micrometer mount which can be adjusted in two orientations. As for the semi-transparent film 19, it can also be inclined at a 45° angle, and allows for the injection of the laser ray 22 by reflection, the diameter of said laser ray being, after expansion, between 16 and 30 mm. This film 19 will also be placed onto a micrometer amount, adjustable in two orientations. It is understood that both the mirror 18 and the film 19 are placed within the axis of the magnetic field, as is also the autocollimater sight glass 20. The latter features a fine-tuning adjustment of ±0.3 mm at the level of the observed plane. The observed magnification will therefore be on the order of 200 times for a visualization optics 4 of the inverted Cassegrain type, the expansion of which will be 100 mm.

The telescope 21 features two optical groups 44, 45, one that is mobile and diverging 44, and one that converges 45, the deviation between the two being variable, in order to regulate, at will, the power laser ray 3, whatever the wave length. This adjustment allows for partial correction of the intrinsic divergence of each of the employable lasers. The power laser ray 3, thus expanded, is reflected by the mirror 18. As for the laser ray 22, it is reflected by the film 19.

According to another embodiment, the endoscope 11 is coupled with a video-camera 12, thus ensuring a vision, at 45°, of the manipulator 26 and of its sample-holder or of the electron gun, in order to allow for the adjustment of their positions in relation to the source cell 14. The endoscope 11 is air tight at a pressure of $10^{-9}$ torr.

According to another embodiment, it is the autocollimater sight glass 20 which is coupled to a video-camera 12, thus ensuring 90° vision of the sample proper.

The video-camera 12 is therefore adaptable, both on the endoscope 11 and on the sight glass 20.

Figure 7:
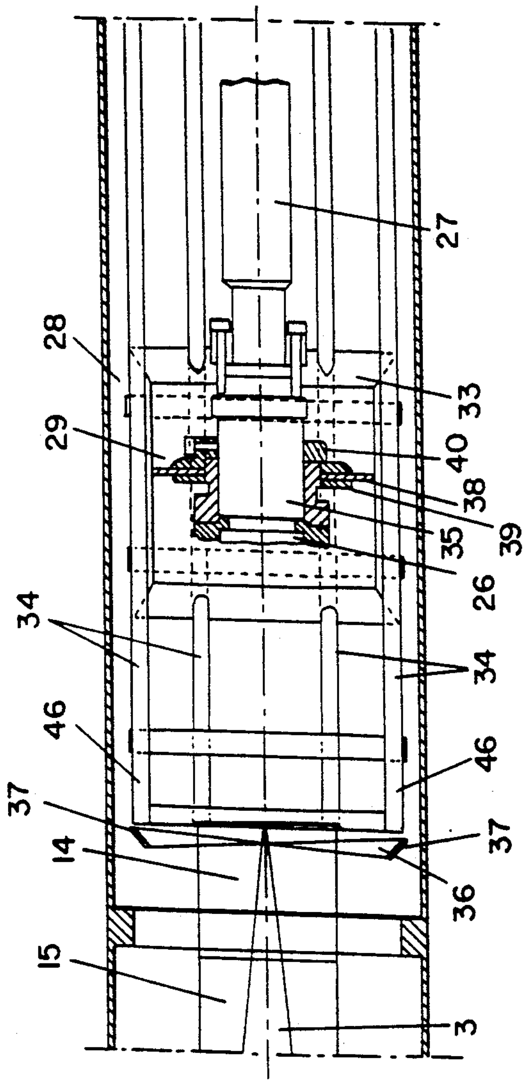
FIG. 7 is a front and cross-sectional view of the guide system and of the blocking system of the manipulator for the sample introduction system of the interface according to the invention.
Figure 6:
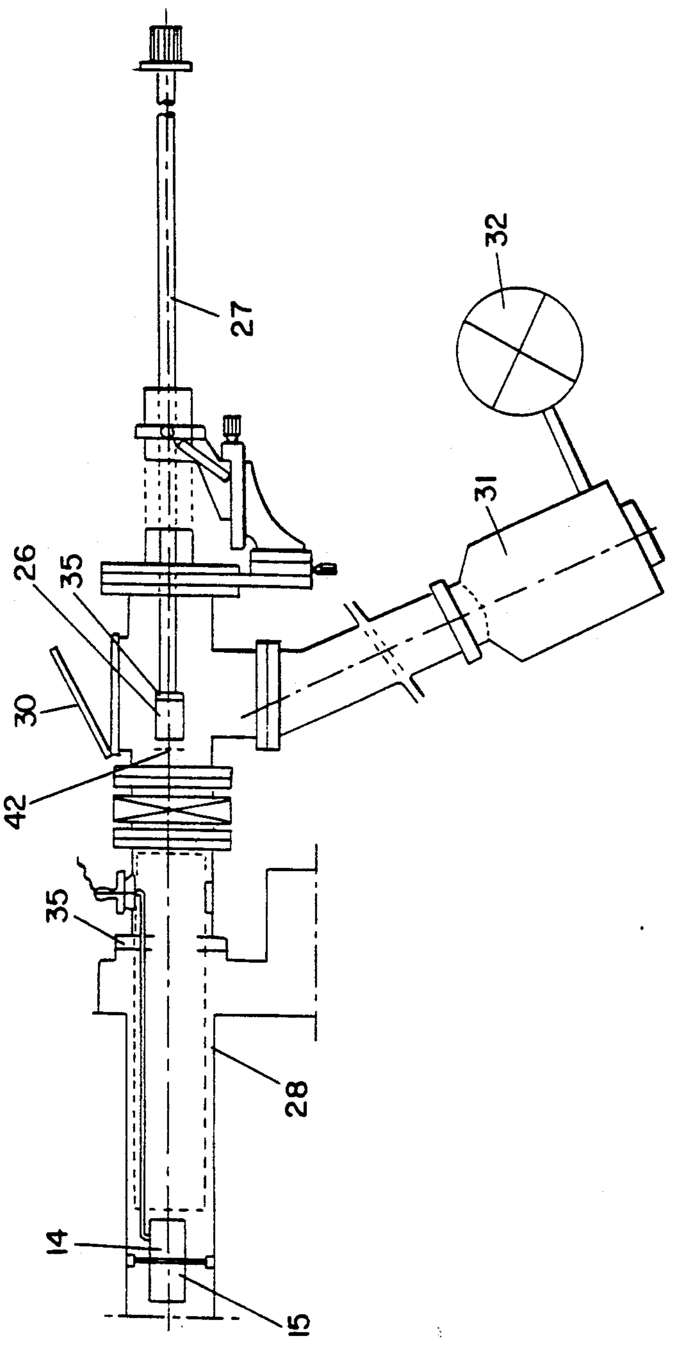
FIG. 6 is a front and cross-sectional view of the chamber for the introduction of the samples of the interface according to the invention.
Figure 3:
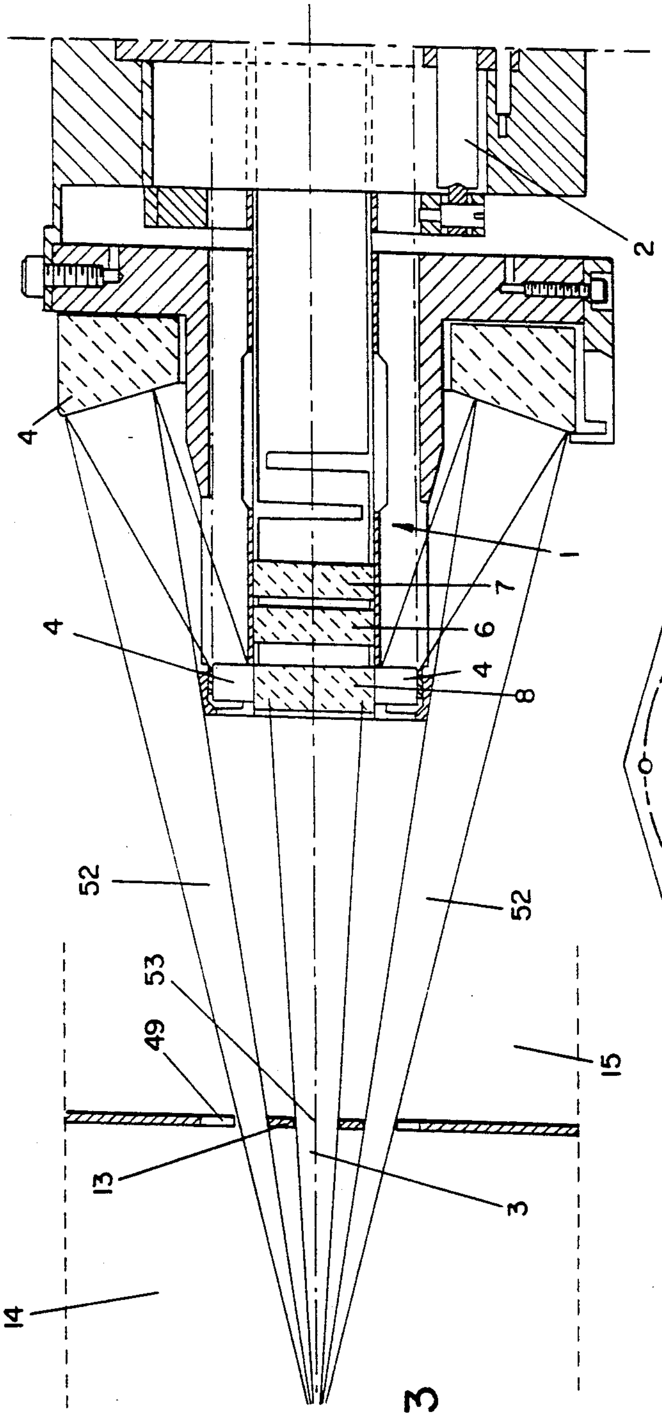
FIG. 3 is a front and cross-sectional magnified view of the focusing and visualization optics represented in FIG. 2.

As shown in FIGS. 6 and 7 of the attached drawings, the system 24 for the introduction of the samples is composed of four different parts, namely an introduction chamber 25 for the samples proper, a manipulator 26 which is integral with the transfer tube 27, a guide system 28 for said manipulator 26, and an anti-vibration blocking system 29 for said manipulator 26.

The manipulator 26, located at one of the two extremities of the transfer tube 27, is advantageously the one which forms the object of patent application no. 86 18244. Said manipulator 26 is, in fact, easily interchangeable with other systems or other ionizing sources. It is understood that it could also be of purely mechanical conception, in the form of a micrometer xyz micro-manipulator, controlled by a system employing three rotary axes, internal to the transfer tube 27, said three axes being controlled, at the end of the tube 27, by three micrometric screws featuring air tight bearings, and possibly motorized.

According to an embodiment of the invention, this manipulator 26 is replaced by an electron impact source, which can be regulated by means of an external manual operational macromanipulator 48 of the tube 27, so that said source is perfectly in line within the axis of the magnetic field, and is kept in this position by the anti-vibration blocking system 29.

As shown in FIG. 6, the introduction chamber 25 features a rapidly opening door or vacuum valve 30 and a turbomolecular pump 31, which is connected to the primary pump 32.

It is understood that the geometry of this introduction chamber 25 must be adaptable to the proper applications. The turbomolecular pump 31 advantageously has a flow of 400 l/s, and is connected to the large capacity pump 32, for example 30 $m^3/H$. The transfer tube 27 is integral with a manual micrometric manipulator, the latter allowing for positioning of the manipulator 26 in front of the source cell 14 under endoscopic control. Actually, the manipulator 26 features, on its front surface, the trapping plate 42 of the source cell 14, and this plate 42 must not, under any circumstances, make contact with the other plates of the source cell 14 (excitation and reception).

As shown in FIG. 7, the guide system 28 is composed of a cylindrical hollow sleeve 33, which is advantageously supported by six bars 34 which rest on an air-tight junction clamp 35 of the transfer tube 27, featuring several openings, with a drifting washer 38, integral with the blocking system 29, sliding inside said sleeve 33.

The guide system 28 can support the optical elements which are necessary for post-ionization, with a second laser ray 36 being, in this case, situated just above the impact point of the primary ionization laser ray 3 and parallel to the surface of the samples; three openings are then located in the junction clamp 35, two of said openings being equipped with windows for the introduction of the post-ionization laser ray 36, and the third opening for the introduction of gasses. Said guide system 28 supports the return prisms 37 and the focusing lenses 46 for the post-ionization laser ray 36, with at least two of the bars 34 being hollow, and the converging lenses 46 located internally. Therefore, it is possible to combine laser microprobe post-ionization with ionic bombardment or desorption by fission-generated heavy atoms (californium 252.)

The blocking system 29 proper is composed of a fixed plane 39 and a mobile plane 40 which, by drawing closer, block the washer 38, while at the same time allowing the manipulator 26 to move perpendicular to the axis of the magnetic field, and therefore to be perfectly positioned in front of the source cell 14.

The effort transmitted to the two planes 39, 40 is advantageously obtained by the intermediary of a motive element in the form of two pre-strained plates opposing each other, made of a quasi-elastic alloy and located on both sides of, and in direct contact with a Peltier effect cell, with the mobile plane 40 coming to rest on said two plates. The current within the Peltier effect cell creates a temperature gradient between the two plates, causing a displacement of their extremities, which rest on the mobile plane 40 which blocks the position of the drifting washer 38. This blocking system 29 therefore has the advantage of being integral with the air-tight and disassemblable support of the electrical connections located at the extremity of the transfer tube 27. This it can block, in the proper position and in front of the double cell 14, 15, both the manipulator 26 and a source of electron impact, or else another specific system (for example another type of sample-holder, which must of course be adaptable to the chosen air-tight connector.)

This laser microprobe interface therefore has the following advantages:

- It allows for placement of the manipulator 26, which can be pivoted from a distance and is insensitive to the magnetic field, in front of the double cell 14, 15;
- It accepts several types of pulsed lasers: excimere, Nd-Yag, frequency corresponding coloring, possibly $CO_2$;
- it is possible to perform, later on, different primary post-ionization experiments, for example: photon tests (laser), ionic tests (SIMS) or atom bombardment tests using atoms generated by fission or radioactive atoms (californium 252);
- it is compatible with electron impact ionization of gasses or liquids, the latter vaporizable at reduced pressure, without generating excessive pollution;
- it can be heated at 200° C., in order to avoid memory effects;

it allows for the possibility of visually checking the adjustment and fine-tuning operations of the manipulator.

Consequently, this laser microprobe interface has the property of, on the one hand, being versatile, since it accepts several types of laser, on the other hand, it can be modulated as a function of several types of tests (electron impact of gas or desorption by ionic bombardment), and finally it can be further developed, which means that it allows for adapting other systems at the extremity of the transfer tube 27.

It is understood that the invention is not limited to the form of embodiment which is hereby described and represented in the attached drawings. Modifications remain possible, in particular concerning the structure of the various elements, or the substitution of technical equivalents, without leaving the scope of the invention.

We claim:

1. Laser microprobe interface for a mass spectrometer in which the ions are generated inside a cell from a sample comprising: focusing optics and visualization optics, an optical stage allowing for the introduction and adjustment of laser rays as well as for the visualization of the samples, and a system for the introduction of the samples, wherein the focusing optics (1) and the visualization optics (4) are located inside the mass spectrometer itself, with the focusing optics (a) being adjustable through means for adjusting (2), thereby to take into account the variation of the focal distance as a function of the wave length of the primary ionization laser ray (3), and being placed at the center of the visualization optics (4), the visualization optics being formed of the achromatic inverted Cassegrain type thereby ensuring perfect image definition and significant magnification, and offering good depth of field and good laser focusing, the location of the focusing optics (1) thereby also allowing for the interchange of the focusing optics (1) with other ionization means.

2. Laser microprobe interface according to claim 1, wherein the focusing optics (1), located in the center of the visualization optics (4), has two lenses (6, 7) and integrates a protection window (8), the focusing optics being integral with the means for adjusting (2) which thereby allows their adjustment to take into account the variation of the focal distance as a function of the wave length of the ionizing laser ray (3).

3. Laser microprobe interface according to claims 1 or 2, wherein the adjustment means (2) is formed by an adjustable pullrod operated by an air-tight blower (9), located at the exterior of a support clamp (10) of a mass spectrometer double cell (14, 15).

4. Laser microprobe interface according to claim 1, wherein the visualization optics (4), of the achromatic inverted Cassegrain type, has an extension of about 100 mm, thereby providing an image quality limited by diffraction, with a diameter of the first black ring of the diffraction spot being 4 micrometers maximum, the observed field being ±0.25 mm from the focusing point of the laser ray (3).

5. Laser microprobe interface according to claim 1, wherein a cell-holder (5) has a sufficient diameter to allow for the introduction of the visualization optics (4), and including an endoscope (11) having a light guide and being supported by a support clamp (10) and by a cell-holder (5).

6. Laser microprobe interface according to claim 5 wherein the endoscope (11) is coupled to a video-camera (12) to allow vision at a 45° angle of a manipulator (26) and a sample-holder thereby to allow adjustment of their positions.

7. Laser microprobe interface according to claim 1, including an optical state (16), which has the form of an optical plane (17), on which are located, within the axis of the magnetic field, a total mirror (18) and a semi-transparent film (19) for the reflection of the laser ray (3), and autocollimater sight glass (20) and, perpendicular to the optical axis, a telescope (21) for the expansion of the power laser ray (3) and a pilot helium-neon laser (22) followed by an expander (23) for the helium-neon laser ray (22).

8. Laser microprobe interface according to claim 7 wherein the mirror (18) is inclined at a 45° angle, and has a diameter of about 16 mm, and is aluminum treated in order to optimize the reflection of the power laser ray.

9. Laser microprobe interface according to claim 7, wherein the telescope (21) has two optical groups (44, 45), one mobile and diverging (44) the other converging (45), the deviation between the two being variable to adjust, at will, the power laser ray (3), regardless of wave length.

10. Laser microprobe interface according to claim 7, wherein the autocollimator sight glass (20) is coupled with a video-camera (12), thus allowing vision at a 90° angle of the sample proper.

11. Laser microprobe interface according to claim 1, including a conductance limit (13) between an analysis cell (15) and a source cell (14) in the mass spectrometer, the conductance limit having an orifice (53) which allows the transfer of the ions and the passage of the laser ray (3), a quartz lamella (49) which allows for the passage of the helium-neon laser ray (22) or of a visible/ultraviolet power laser (50), or of a light ray generated by a lighting system (51) incorporated with a sight glass (20), and of the ray (52) reflected by the samples, while at the same time preserving the required differential vacuum in the source cell (14) and in the analysis cell (15).

12. Laser microprobe interface according to claim 1, including a conductance limit (13) between an analysis cell (15) and a source cell (14) in the mass spectrometer, the conductance limit having a single central orifice (53) allowing ion transfer and the passage of the laser ray (3), with the analysis cell (15) being cubical, having a trapping plate (54) perforated in a honeycomb pattern and having a central orifice (56) and an annular orifice (57) which allow for the passage of the helium-neon laser ray (22) or of the visible ultraviolet power laser (50), or of a light ray generated by a lighting system (51), incorporated with the sight glass (20), and of the ray (52) reflected by the samples, while at the same time preserving the required differential vacuum in the source cell (14) and in the analysis cell (15).

13. Laser microprobe interface according to claims 11 or 12, wherein the orifice (53) has a maximum diameter of 4 mm, in order for the differential vacuum between the source cell (14) and the analysis cell (15) to be of a factor of 100.

14. Laser microprobe interface according to claim 1 wherein the sample introduction system (24) is composed of four separate parts, namely an introduction chamber (25) for the samples proper, a manipulator (26) which is integral with a transfer tube (27), a guide system (28) for said manipulator (26) and an anti-vibration blocking system (29) of said manipulator (26).

15. Laser microprobe interface according to claim 14 wherein the manipulator (26) is formed by three rotary axes, internal to the transfer tube (27), said three axes being controlled by three micrometric screws which are equipped with air-tight bearings.

16. Laser microprobe interface according to claim 1 wherein the sample introduction system includes an electron impact source which can be regulated by means of a manual external macromanipulator (48) which operates a tube (27), in order for said source to be perfectly in line within the axis of the magnetic field, and kept in this position by an anti-vibration blocking system (29).

17. Laser microprobe interface according to claim 14 wherein the introduction chamber (25) includes a rapidly opening door (30) and a turbomolecular pump (31), connected to a primary pump (32).

18. Laser microprobe interface according to claim 14 wherein the guide system (28) is formed by a hollow cylindrical sleeve (33) supported by six bars (34) which rest on an air-tight junction clamp (35) or the transfer tube (27), and a drifting washer (30) integral with the blocking system (29) proper, sliding inside said sleeve (33).

19. Laser microprobe interface according to claim 18 wherein the guide system (28) supports the optical elements necessary for post-ionization, means for providing a post-ionization laser ray (36) located just above the impact point of the primary ionization laser ray (3), and parallel to the surface of the samples, with three openings provided on the junction clamp (35), two of said openings having windows for the introduction of the post-ionization laser ray (36), and the third for the introduction of gasses.

20. Laser microprobe interface according to claim 14 wherein the blocking system (29) is composed of a fixed plane (39) and a mobile plane (40) which, by drawing closer, block the washer (38), while at the same time allowing for movement of the manipulator (26) perpendicular to the axis of the magnetic field and thus providing perfect positioning of said manipulator in front of the source cell (14).

21. Laser microprobe interface according to claim 20 including a motive element in the form of two opposing pre-strained plates, the latter made of a quasi-elastic or "form memory" alloy, and located on both sides of, and in contact with, a Peltier effect cell, the mobile plane (4) coming to rest onto the two plates.

* * * * *